Nov. 11, 1958  V. SUTTON  2,859,731
PUPPY COMFORTER
Filed June 5, 1957

United States Patent Office 2,859,731
Patented Nov. 11, 1958

2,859,731

PUPPY COMFORTER

Vera Sutton, Rockville Centre, N. Y.

Application June 5, 1957, Serial No. 663,641

2 Claims. (Cl. 119—1)

This invention relates generally to the field of stuffed dolls, and more particularly to an improved device adapted to comfort very young animals.

It is generally well known that very young puppies when taken from their mother have difficulty adjusting to new environs, particularly at night when difficulty in sleeping is experienced. This behavior is generally attributed to a lack of emotional security which stems from the feeling of warmth of the mother's body, and a consciousness of the pulse of the mother's heart. Since it is ordinarily not possible to provide a feeling of security in this manner, it is among the principal objects of the present invention to provide a device capable of simulating the above described sensations with view toward imparting an adequate feeling of security to the young puppy.

Another object of the invention lies in the provision of an improved puppy comforting device in the form of a stuffed figure having means for imparting warmth to a puppy placed beside it, and having means for simulating the heartbeat of an adult animal.

A further object of the invention lies in the provision of a device of the class described which may be substantially trouble-free in operation throughout its useful life, so as to be useable during a period of puppyhood of a large succession of dogs.

Another object of the invention lies in the provision of a puppy comforting device possessed of the above characteristics in which the cost of fabrication may be of a reasonably low order, with consequent wide sale, distribution and use.

Still another object of the invention lies in the provision of a puppy comforting device which may be operated entirely on electrical energy over relatively long periods of time without attendance on the part of the animal owner.

These objects, as well as other incidental ends and advantages, will become more clearly apparent during the course of the following disclosure, and be pointed out in the appended claims.

On the drawing, to which reference will be made in the specification, similar reference characters have been employed to designate corresponding parts throughout the several views.

Figure 1:
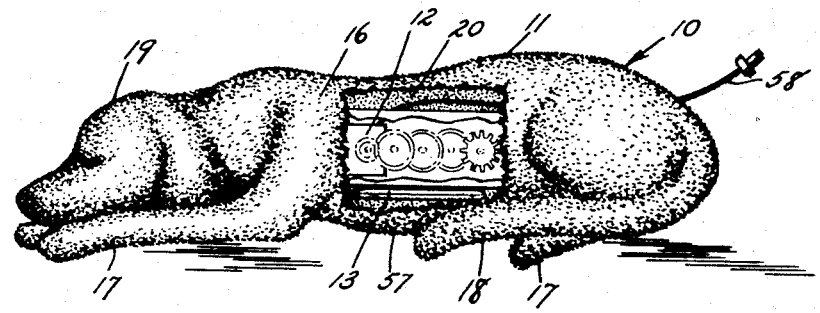
Figure 1 is a view in perspective, partly broken away to show detail of an embodiment of the invention.

In accordance with the invention, the device, generally indicated by reference character 10 comprises broadly: an animal figure element 11, pulse producing means 12 and a heating element 13.

The animal figure element 11 is formed to simulate a dog or other animal in a reclining or sleeping position, and may be manufactured by existing techniques known in the art. It includes an outer covering 15 which may be provided with simulated fur, a main body portion 16, leg members 17, a tail member 18 and a head member 19. The outer covering 15 is filled with suitable stuffing 20 in which a cavity is provided to accommodate the casing 21 of the pulse producing means 12.

Figure 2:
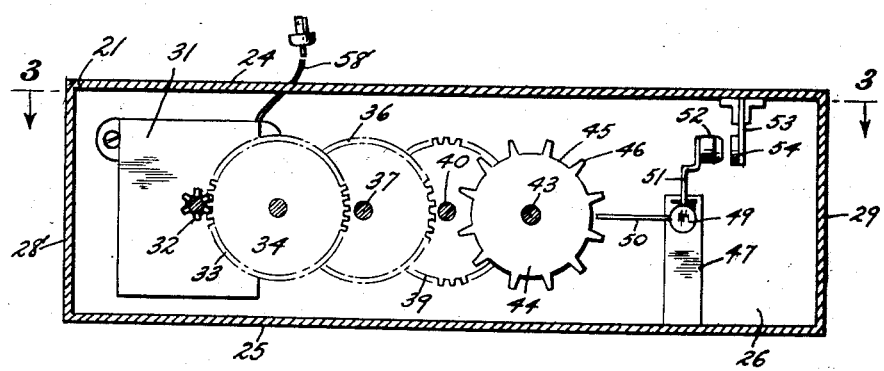
Figure 2 is a vertical sectional view of the pulse producing means comprising a part of the embodiment, as seen from the plane 2—2 on Figure 3.
Figure 3:
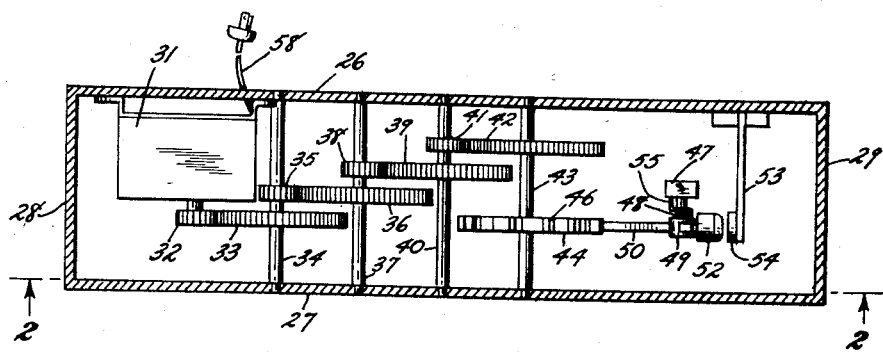
Figure 3 is a horizontal sectional view as seen from the plane 3—3 on Figure 2.

The pulse producing means 12 may be of any suitable type, but owing to the necessity of operation over relatively long periods, the same is preferably electrically powered. The casing 21 is preferably formed of planar wood sections, and includes a top member 24, a bottom member 25, side members 26 and 27 as well as end members 28 and 29. Disposed within the casing 21 is a synchronous motor 31 of a type generally resembling those used in electrically powered clocks, but of somewhat greater output torque. Motors of this type can generally be relied upon to provide a constant output feed and are therefore capable of producing a substantially uniform pulse. The output shaft pinion 32 (see Figures 2 and 3) drives a gear 33 on a shaft 34 journaled between the side members 26 and 27. The shaft 34 also mounts a pinion 35 which meshes with a gear 36 on shaft 37, the shaft 37 mounting a pinion 38 which drives a gear 39 on shaft 40. Shaft 40 mounts a pinion 41 which meshes with gear 42 on the shaft 43, the gear train comprising the members 32—43 being sufficient to reduce the final stage to an angular velocity of several revolutions a minute.

A driving wheel 44 is mounted upon shaft 43 and rotates with the same as driven by the gear 42. The driving wheel includes an outer peripheral surface 45 provided with a plurality of projecting members 46 spaced at substantially equal intervals around the surface 45. Extending upwardly from the bottom member 25 of the casing 21, is a support member 47 having a substantially horizontally disposed shaft 48 extending therefrom. A bell crank member 49 is mounted upon the shaft 48 and includes a driving wheel engaging portion 50 and a striker supporting portion 51, the portions 50—51 being disposed at substantially right angles. Mounted upon the extremity of the striker supporting portion 51 is a soft rubber striker 52 engageable at periodic intervals with a rubber bumper 54 engageable at supporting member 53 supported from the top member 24. A torsion spring 55 urges the bell crank member 49 in a clockwise direction as seen on Figure 2.

The heating element 13 may be of any suitable resistance wire type, and is preferably disposed in circular arrangement about the pulse producing means 12, that is to say, at approximately the middle part 57 of the body portion 16. Individual switch means (not shown) may be provided in such manner that the line cord 58 may supply current to both the pulse producing means 12 and the heating element 13.

In use, the device is installed in the location where the puppy will be placed for sleeping, and the puppy positioned along side the device adjacent the heating element. The means 12 and 13 are then energized, so that the figure element 11 exudes warmth and the pulse producing means 12 produces a soft beat which is transmitted through the insulated stuffing 20 in such a manner as to resemble the heartbeat of the absent mother.

Where electric power is not conveniently available, a chemical heating means (not shown) may be substituted and the synchronous motor 31 may be replaced by a slowly unwinding clockwork means (not shown) which is capable of operation for a time sufficient to induce the puppy to sleep.

I wish it to be understood that I do not consider the invention limited to the precise details of structure shown and set forth in this specification, for obvious means will occur to those skilled in the art to which the invention relates.

I claim:

1. In a device for comforting puppies including an animal figure element having a main body portion, said main body portion having a cavity therein, the improvement comprising pulse producing means disposed within said cavity, said pulse producing means having an electric motor capable of maintaining a substantially constant speed, a gear train connected to the output shaft of said motor for reducing the speed thereof, a driving wheel driven by said gear train, said driving wheel having a plurality of radially arranged projections thereon, a bell crank member supported for pivotal motion, and having a driving wheel engaging portion and a striker supporting portion arranged at an angle with respect to said driving wheel engaging portion, a soft resilient striker mounted upon said striker supporting portion, a rubber bumper disposed in the path of motion of said striker, resilient means for urging said bell crank member in a direction toward said bumper, whereby operation of said motor serves to periodically move said bell crank in a first direction against the action of said resilient means and release the same to allow said bell crank to move in an opposite direction to strike said bumper, and transmit a simulated heartbeat to said animal figure.

2. In a device for comforting puppies including an animal figure element having a main body portion, said main body portion having a cavity therein, the improvement comprising pulse producing means disposed within said cavity, said pulse producing means having a synchronous electric motor, a gear train connected to the output shaft of said motor for reducing the speed thereof, a driving wheel driven by said gear train, said driving wheel having a plurality of radially arranged projections thereon, a bell crank member supported for pivotal motion, and having a driving wheel engaging portion and a striker supporting portion arranged at an angle with respect to said driving wheel engaging portion, a soft resilient striker mounted upon said striker supporting portion, a rubber bumper disposed in the path of motion of said striker, resilient means for urging said bell crank member in a direction toward said bumper, whereby operation of said motor serves to periodically move said bell crank in a first direction against the action of said resilient means and release the same to allow said bell crank to move in an opposite direction to strike said bumper, and transmit a simulated hearbeat to said animal figure.

References Cited in the file of this patent

UNITED STATES PATENTS

| | | |
|---|---|---|
| 1,896,663 | Collins | Feb. 7, 1933 |
| 2,647,195 | Broyles | July 28, 1953 |
| 2,757,480 | Uchill | Aug. 7, 1956 |